United States Patent [19]

Razzano et al.

[11] 4,222,917

[45] Sep. 16, 1980

[54] PROCESS AIDS FOR HEAT CURED SILICONE RUBBER COMPOSITIONS

[75] Inventors: John S. Razzano, Watervliet; George P. De Zuba, Mechanicville; Ned J. Reo, Clifton Park, all of N.Y.

[73] Assignee: General Electric Company, Waterford, N.Y.

[21] Appl. No.: 970,420

[22] Filed: Dec. 18, 1978

Related U.S. Application Data

[63] Continuation of Ser. No. 847,195, Oct. 31, 1978, abandoned.

[51] Int. Cl.$^2$ .............................................. C08L 83/04
[52] U.S. Cl. ............................. 260/29.1 SB; 252/182; 528/18
[58] Field of Search ................. 260/29.1 SB; 448.2 E; 252/182; 528/18

[56] References Cited

U.S. PATENT DOCUMENTS

| | | | |
|---|---|---|---|
| 3,560,437 | 2/1971 | Szendrey | 260/46.5 |
| 3,925,285 | 12/1975 | Newton | 260/46.5 |

*Primary Examiner*—Lewis T. Jacobs
*Attorney, Agent, or Firm*—E. Philip Koltos; John L. Young; Philip L. Schlamp

[57] ABSTRACT

There is provided process aids for heat cured silicone rubber compositions which are the reaction product of a cyclictrisiloxane, and water or an aliphatic alcohol found in the presence of a catalyst which may be selected from certain moderate to high strength organic acids, lithium hydroxide, ammonia, ammonium hydroxide and primary amines. The advantage of such a process aid is that it is considerably less expensive to produce in silicone manufacturing facilities than the more traditional process aids that have been used in the past.

15 Claims, No Drawings

4,222,917

PROCESS AIDS FOR HEAT CURED SILICONE RUBBER COMPOSITIONS

This application is a continuation of parent application Ser. No. 847,195 filed on Oct. 31, 1978, now abandoned.

BACKGROUND OF THE INVENTION

The present invention relates to a process aid for heat cured silicone rubber composition and more particularly, the present invention relates to process aids in which the basic ingredient is a cyclictrisiloxane for use with heat cured silicone rubber compositions.

Heat cured silicone rubber compositions are well known in the silicone art. Such heat cured silicone rubber compositions have as the basic ingredient a linear diorganopolysiloxane polymer having a viscosity anywhere from 1,000,000 to 2000,000,000 centipoise at 25° C., a filler which may be extending or reinforcing filler: examples of reinforcing fillers being fumed silica and precipitated silica. such compositions also include a catalyst which is usually a peroxide curing catalyst. Such a composition can also include other ingredients such as self-bonding additives, compression set additives, heat aging additives, post cure additive, etc. In the fabrication of such compositions it is common to mix the filler and the diorganopolysiloxane polymer in the dough mixer and then add all the other necessary ingredients except for the peroxide curing catalyst. The composition is then cleaned by straining it through a screen, adding a peroxide catalyst to it and then fabricating or extruding it into various desired parts. Such prefabricated compositions are then shipped from the silicone manufacturing facilities to the various customers who take the composition and perform additional finishing operations on the fabricated part and then heat it at elevated temperatures that are above 100° C. to form a silicone elastomer. In other types of compositions shipped from silicone manufacturing facilities the composition with a filler and the other additives, but without any catalyst, is shipped. The purchaser of the composition takes it and adds to it the desired amount of peroxide curing catalyst then fabricates it or extrudes it into a desired part after which the composition is heated at temperatures above 100° C. to produce the desired silicone elastomeric part.

It was early noticed in the fabrication of cured silicone rubber compositions that the prefabricated parts or even slabs of unfabricated uncured silicone rubber compositions would structure with aging it even relatively short periods of time such as a month or less. That is the composition which would set in the position it was stored and the shape of the uncured silicone rubber composition could be changed only with difficulty.

Accordingly, such compositions would set in what is known in the silicone art as crepe hardening. Accordingly, because of such crepe hardening, uncured silicone compositions which had been stored for periods of a month or more would be very difficult to mill on mills to incorporate catalyst into them or it would be very difficult to extrude or to fabricate into the desired part. Because of such crepe hardening, uncured silicone rubber compositions of the past were difficult to process. It was desired to have uncured heat cured silicone rubber compositions that would not structure or set for a period of a year or more after manufacture and which would have the same amount of swelling in an extrusion die for a period of a year or more. In addition, it was desired that the uncured heat curable silicone rubber composition would not structure for a period of a year or more after manufacture so that it did not have to be intentionally remilled to make it flowable before it could be fabricated to the desired part. Accordingly, to correct this problem there was developed as what is known in the silicone art as process aids. Such process aids which for the most part were silicone polymers, are incorporated into the diorganopolysiloxane polymer of heat cured silicone rubber compositions along with a filler. As the result of the use of such process aids and the more preferable ones, it was found that structuring could be substantially reduced if not eliminated. Examples of such desirable process aids are for instance those to be found in the Martellock U.S. Pat. Nos. 3,464,945 Fekete 2,954,357 and Konkol, et al, 2,890,188. Although such process aids work well in the production of heat cured silicone rubber compositions to prevent structuring; nevertheless, they were expensive to produce and they were used in quantities of anywhere from 1 to 25 parts per hundred parts by weight of diorganopolysiloxane polymer. This necessarily increases the cost of the heat cured silicone rubber composition. In addition, the processes for producing such process aid such as that disclosed above, were somewhat difficult to carry out requiring a certain amount of planning, equipment and manpower. Accordingly, it was highly desirable to develop an inexpensive process aid, and specifically, one that would utilize known by-products that are produced in silicone manufacturing plants. It should also be noted that such prior art processes for producing process aids as disclosed in the foregoing patents also involved the use at times of solvents, which added to environmental problems in their disposal after the desired process aid had been produced. Accordingly, it was also highly desirable to utilize as a process aid silicone compounds that were not found from undesirable reactants or solvents or created by-products that had to be disposed of properly in view of environmental restrictions.

One approach to this problem was the use of trifluoracetic acid as disclosed in Karstedt, et al U.S. Pat. No. 3,671,546. However, as noted in that disclosure trifluoracetic acid was added primarily to prevent the filler from clumping or balling up when it was mixed into the base diorganopolysiloxane polymer. It was disclosed to be utilized as a supplement to traditional process aids that were used with heat cured silicone rubber composition. Accordingly, Karstedt, et al Patent had not found a substitute for traditional process aids in the production of heat cured silicone compositions.

Accordingly, it was high desirable to produce a process aid that could be produced in situ in the mixing apparatus for the heat curable silicone rubber composition when the diorganopolysiloxane polymer was mixed with the filler. It was also highly desirable to have a process aid that not only prevented structuring in heat curable silicone rubber compositions, but also prevented clumping and balling up of filler when it was mixed in diorganopolysiloxane polymer in the dough mixer.

Accordingly, it is one object of the present invention to provide for an inexpensive process aid for heat curable silicone rubber composition.

It is another object of the present invention to provide process aid which can be prepared in situ in the mixing equipment for heat curable silicone rubber compositions.

It is an additional object of the present invention to produce a process aid for heat curable silicone rubber utilizing as a reactant a compound which is readily available by-product at silicone manufacturing facilities.

It is yet an additional object of the present invention to provide for a process aid for heat curable silicone rubber composition which does not necessitate special equipment or process procedures to prepare.

It is still another object of the present invention to provide a simple process for producing process aids for heat curable silicone rubber compositions. These and other objects of the present invention are accomplished by means of the disclosure set forth herein below.

SUMMARY OF THE INVENTION

There is provided by the present invention a process aid for heat curable silicone compositions comprising a reaction product of (a) 100 parts by weight of a cyclictrisiloxane of the formula, $(RR'SiO)_3$ where R and R' is selected from monovalent hydrocarbon radicals, and halogenated monovalent hydrocarbon radicals; (b) at least 3 parts by weight of a hydroxy containing additive selected from the class consisting of water and $R^2OH$ where $R^2$ is an alkyl radical of 1 to 3 carbon atoms and (c) at least 200 parts per million of a catalyst selected from the class consisting of moderate to strong strength organic acids, LiOH, $NH_3$, $NH_4OH$ and $R^3NH_2$ where $R^3$ is a monovalent hydrocarbon radical. The foregoing reaction product process aid is obtained by reacting the above ingredients in the presence of the basic diorganopolysiloxane polymer with or without filler; by reacting the ingredients at a temperature in the range of 140° to 170° C. for a period of time of at least ½ hour. It should be noted that any cyclictrisiloxane which is compatible with the base diorganopolysiloxane polymer can be utilized in the foregoing process to produce a process aid. It should be noted that only cyclictrisiloxanes can be utilized in the instant process since other cyclicpolysiloxanes are not reactive enough. If a less reactive cyclicsiloxane is utilized such as cyclictetrasiloxane, then the type of catalyst needed to react with the cyclicsiloxane, such as strong hydrochloric or sulfuric acid, would also attack and break up the polymer chain of the base diorganopolysiloxane polymer. In the foregoing formulas, R and R' can be selected from methyl and are most preferably methyl, however, they can also be selected from alkyl radicals from 1 to 8 carbon atoms, alkenyl radicals of 2 to 8 carbon atoms such as vinyl, mononuclear aryl radicals, such as phenyl radicals and haloalkyl radicals such as 3,3,3 trifluoropropyl. R and R' can both be methyl or phenyl. It is preferred when one of the radicals is specifically R' is an alkenyl radical such as vinyl or haloalkyl radicals such as 3,3,3 trifluoropropyl that the R radical be alkyl radical of 1 to 8 carbon atoms such as methyl.

It should be noted that water is the much preferred ingredient in the instant process aid and specifically from 3 to 15 parts of water per 100 parts by weight of the cyclictrisiloxane. If an alcohol is utilized then there can be utilized an alcohol at concentrations of anywhere from 4.5 to 90 parts by weight of alcohol per 100 parts of cyclitrisiloxane. Again while at least two thousand parts per million of the catalyst will work in the instant invention, in the case of a strong organic acid, such as the preferred trifluoroacetic acid, it is preferred that such acid be utilized at a concentration of anywhere from 200 parts per million to 0.5 parts by weight based on 100 parts of the cyclictrisiloxane. A more preferred range for the moderate strength acid is anywhere from 500 to 2000 parts per million. For the basic catalyst, the concentrations are slightly different. Accordingly, for the basic catalyst, it is preferable that it be present at a concentration from anywhere from 500 to 20,000 parts per million and more preferably 4,000 to 10,000 parts per million per 100 parts of the cyclictrisiloxane. At any rate, the optimum values for the use of a particular base or acid in preparing the process aid of the instant case will vary and depend on the particular organic acid or base that is utilized in a reaction. It should be noted that the instant process aid obtained by being formed in situ in contact with the diorganopolysiloxane base polymer and also possibly in contact with filler in the composition. Generally, the reaction product process aid is present or its ingredients are present at a concentration of anywhere from 1 to 25 parts by weight to more preferably 4 to 10 by weight per 100 parts of the base diorganopolysiloxane polymer.

DESCRIPTION OF THE PREFERRED EMBODIMENT

The R and R' in the formula recited for the trisiloxane can be selected from any monovalent hydrocarbon radical and halogenated hydrocarbon radical. Examples of such radicals are, for instance, alkyl radicals of 1 to 8 carbon atoms, cycloalkyl radicals of 5 to 8 carbon atoms, mononuclear aryl radicals such as phenyl, methylphenyl, ethylphenyl alkenyl radicals 2 to 8 carbon atoms vinyl allyl, etc. and haloalkyl radicals of 1 to 8 carbon atoms such as 3,3,3 trifluoropropyl. In addition, both R and R' radical can be the same or they can be different. Most preferably the R radical is selected from alkyl radicals of 1 to 8 carbon atoms such as methyl, alkenyl radicals such as vinyl with possibly haloalkyl radicals of 1 to 8 carbon atoms such as 3,3,3 trifluoropropyl. In a preferred embodiment, it is preferred that R be selected from the class consisted alkyl radicals and aryl radicals of 1 to 8 carbon atoms and most preferably methyl and phenyl and the R' radicals be selected from the class of alkyl radicals, alkenyl radicals and aryl radicals as well as fluoroalkyl radicals of 1 to 8 carbon atoms, the most preferred radicals for R' being methyl, vinyl, phenyl and 3,3,3 trifluoropropyl radicals. It is preferred that both the R and R' radical not be selected from a vinyl radical or 3,3,3 trifluoropropyl radical. When one of the R or R' radicals is vinyl or 3,3,3 trifluoropropyl, when it is preferred that the other radical be selected from alkyl radicals of 1 to 8 carbon atoms. Such cyclictrisiloxanes are well known in the art and are reasonably obtainable in any silicone manufacturing facility. It should be pointed out that any known cyclictrisiloxane will operate as the main ingredient for producing the reaction product process aid of the instant case. Other cyclicisiloxanes will not work since they do not have the proper reactivity. For instance, cyclictetrasiloxanes will not operate in the invention of the instant case since any catalyst that will attack the ring to form the reaction product process aid of the instant case will also attack and degrade the polymer chain of the basic diorganopolysiloxane polymer. Accordingly, it is disclosed that only cyclictrisiloxanes will operate as the main reactant for producing the process aid reaction product of the instant case. In addition, cyclipentasiloxanes and other cyclicsiloxanes will be attacked with the same degree of difficulty as the cyclictetrasiloxane by a catalyst as disclosed in the instant invention and as such any catalyst that would attack such cyclictetrasiloxane and higher cyclicsiloxanes would also attack and degrade the linear diorganopolysiloxane polymer. Such cyclictrisiloxane are well known in the art and are available as by-products in the formation of cyclictetrasiloxanes as is well known in silicone manufacturing facilities.

In the production of cyclictetrasiloxanes which are utilized in the production of diorganopolysiloxane polymers, diorganodichlorosilanes are hydrolyzed in water and there is added to them a small amount of a strong catalyst such as potassium hydroxide and the resulting hydroylzate is cracked to distill overhead a mixture of cyclictrisiloxanes, cyclictetrasiloxanes and other cyclicsiloxanes. By such a cracking procedure, there is preferentially distilled overhead and obtained in essentially pure form by distillation separation techniques the cyclictetrasiloxanes which are utilized in the formation of diorganopolysiloxane polymers. However, by such a process, there is also obtained as a by-product cyclictrisiloxanes in substantial quantities. Such cyclictrisiloxanes within the scope of the cyclictrisiloxanes of the formula given above may be obtained in essentially pure form to be utilized to produce the reaction product process aid of the instant case. In a normal procedure, such cyclictrisiloxanes that are obtained from the cracking process, are usually recycled as ingredients in the cracking process of diorganodichlorosilanes on hydrolyzates so as to produce as much cyclictetrasiloxanes as possible. In accordance with the disclosure of the instant process, such by-product cyclictrisiloxane may be obtained and separated and utilized as ingredients in the process of the instant case. It should be noted that fluoroalkyl substituted cyclictrisiloxanes are utilized as such in the production of diorganopolysiloxane polymers. Accordingly, such fluoroalkyl substituted cyclictrisiloxanes may be obtained readily from manufacturing procedures of fluoroalkyl substituted diorganopolysiloxane polymers and utilized in the process of the instant case to obtain desirable process aids for fluoro substituted heat curable silicone rubber composition. The other necessary ingredients to produce the reaction product process aid of the instant case can be selected from water or an aliphatic alcohol of the formula $R^2$OH where $R^2$ is an alkyl radical 1 to 3 carbon atoms and it is preferably methyl. Accordingly, water is preferred as the reactant since it has the most concentrated amounts of hydroxy groups to impart to the process aid reaction product. However, the aliphatic alcohols can be also utilized.

Accordingly, per 100 parts of the cyclictetrasiloxanes, it is generally desired they be utilized 3 parts by weight of water with a maximum of up to 15 parts of water. If less than 3 parts of water is utilized, then the necessary reaction product process aid is not obtained. If more than 15 parts of water is utilized per 100 parts by weight of the cyclictrisiloxane then the excessive water clumps up the filler that is added to the composition making it very difficult to mix into the diorganopolysiloxane polymer. It should be noted if one decided to utilize an aliphatic alcohol as the hydroxy containing additive, then when methanol is utilized, 1.6 times as much of the alcohol is necessary as compared to water; 2.5 times as much of the ethanol is desired per 100 parts of the cyclictrisiloxane; and when propanol is utilized, 3.2 times as much of the propanol is desired as compared to water in order to produce the process aid reaction product of the instant case. It should also be noted that water and those mixtures of water and aliphatic alcohols can be utilized as hydroxy containing additives to produce the process aid reaction product of the instant case. Accordingly, generally these three parts of water up to 15 parts by weight of water is desired to be mixed with the cyclictrisiloxane and reacted with the cyclictrisiloxane. In terms of aliphatic alcohols of 1 to 3 carbon atoms, it is preferred that those be utilized from 4.5 to 90 parts by weight of the aliphatic alcohol per 100 parts of the cyclictrisiloxane depending on the particular alcohol. Most preferably, water is desirable as the hydroxy containing additive in the process to produce the process aid of the instant case since it is cheaper than the alcohols and will impart the maximum amount of hydroxy groups to the process aid reaction product. It should also be appreciated that within the concentrations disclosed above, that any quantity of the water and alcohol may be utilized by themselves or in mixtures which give the best reaction product. The above concentrations of hydroxy containing additives are given as a guide with the minimum amount of water that is 3 parts by weight of water being the minimum that is permissible per 100 parts of the cyclictrisiloxane. It should be noted that if more than 15 parts of water or 90 parts by weight of propanol is used, then it will be very difficult to mix the filler into the base diorganopolysiloxane polymer of heat curable silicone rubber compositions.

It should also be noted that hydroxy containing additives other than water and the aliphatic alcohols are not desired in the production of the process aid of the instant case. They are expensive and are of high molecular weight as compared to the amount of hydroxy groups that they contain, such that the reaction with the trisiloxane is difficult or impossible. The other necessary ingredient for producing the process aid reaction product of the instant case is a catalyst which is selected from moderate to high strength organic acids and moderate strength bases. Accordingly, it is desired that the catalyst that is selected be a moderate to high strength organic acid; the purpose of the catalyst being to open up a cyclictrisiloxane to produce a diorganosiloxane polymer having hydroxy groups. However, if the catalyst is not of sufficient strength, then it will not open the cyclictrisiloxane ring and if it is too strong like alkali metal hydroxides or hydrochloric or sulfuric acid, then the acid which opens up the ring will also attack the diorganopolysiloxane polymer in the heat curable silicone rubber composition causing degradation of the polymer making an undesirable for producing heat curable silicone rubber compositions. Generally, it is preferred to utilize an acid having the hydrogen disassociation constant varying from $1 \times 10^{-1}$ to $1 \times 10^{-5}$ and more preferably varying from $1 \times 10^1$ to $1 \times 10^{-3}$. If an acid is utilized that has a disassociation constant outside of these ranges, it will not be strong enough to open the cyclictrisiloxane ring or it will be so strong that they will attack the base polymer. As will be explained below, it is preferred that the process aid of the instant case be formed in situ in the presence of the diorganopolysiloxane base polymer of the heat curable silicone rubber composition to avoid the use of additional processing facilities for producing the process aid thus lowering the cost of producing the reaction product process aid in the instant case. As such a catalyst base or acid need be selected that does not attack and degrade the diorganopolysiloxane gum of the heat curable silicone rubber composition. Preferred acids are for instance, trifluoroacetic acid, trichloroacetic acid and others. It has also been found that trifluoroacetic acid is the most preferred acid since it is of a proper hydrogen ion strength such it will attack the cyclictrisiloxane and open the cyclic chain without degrading the base diorganopolysiloxane polymer. In addition, after the reaction product is formed, the acid can be volatilized and removed from the heat curable silicone rubber composition without the necessity for neutralization agents with the formation of salts in the composition. Generally, such acids are desired to be utilized at a concentration of 200 parts per million to 0.5 parts per hundred parts of the cyclictrisiloxane. If less acid is used, then it will not be sufficient acid to break up open the cyclictrisiloxane and if more than 0.5 parts acid is used, it performs no additional function except increasing the costs. More preferably, there is utilized an acid concentration of 500 to 2000 parts per million per hundred parts of the cyclictrisiloxane. In addition, bases can be used as the catalyst to produce the reaction product process aid of the instant case. Example of bases are for instance, lithium hydroxide, ammonia with additional amount of water present to form ammonia hydroxide or formed ammonium hydroxide and primary amines of the formula $R^3 NH_2$ where $R^3$ is a monovalent hydrocarbon radical. $R^3$ can be selected from many monovalent hydrocarbon radicals and halogenated monovalent hydrocarbon radicals such as alkyl radicals of 1 to 8 carbon atoms, cycloalkyl radicals of up to 8 carbon atoms, mononuclear aryl radicals such as phenyl, methylphenyl, etc. It is most preferred that $R^3$ be an alkyl radical of 1 to 8 carbon atoms. The bases must be of moderate strength such that the bases will attack the cyclictrisiloxane ring and break it open without attacking the base diorganopolysiloxane polymer. If too much base is used, then such excess doesn't serve any purpose but just increases the cost of the process. It should be noted that lithium hydroxide can be utilized in the instant process since it can be neutralized with carbon dioxide to form lithium carbonate which is an inert salt. However, generally the alkali metal hydroxides and other strong bases are undesirable in the process of the instant case since they will usually attack the base diorganopolysiloxane chain.

Generally, the primary amines as well as ammonium hydroxide have the best catalytic properties to produce the process aid of the instant case. It should be noted that if ammonia is used as the catalyst, that there should be added sufficient additional water so that there will be formed the required amount of ammonium hydroxide to act as a catalyst. Generally, any moderate strength base can be utilized to produce the process aid of the instant case having a hydrogen disassociation constant varying from $1 \times 10^{-3}$ to $1 \times 10^{-7}$ and more preferably varying from $1. \times 10^{-4}$ to $1 \times^{-6}$. The base having a disassociation constant above the foregoing range will either degrade the base diorganopolysiloxane polymer or be ineffective in breaking up the cyclictrisiloxane chain.

Although at least 200 parts per million of the base may be utilized, it is preferred that the base be utilized at a concentration that is most effective. Accordingly, it is generally desired that the base be utilized at a concentration of 500 to 20,000 parts per million based on 100 parts of the cyclictrisiloxane or preferably be utilized at a concentration of 4,000 to 10,000 parts per million per 100 parts by weight of the cyclictrisiloxane. Concentrations of bases outside the above ranges do not perform the catalytic function sufficiently. If too little base is utilized, the reaction is too slow and if too much base is utilized, it serves no function and produces undesired neutralized salts in the heat curable silicone rubber composition after the process aid has been formed. Examples of acids and bases that can be utilized as stated previously are for instance trichloroacetic acid, trifluoroacetic acid, lithium hydroxide, ammonia, ammonium hydroxide and primary amines such as, ethyl amines. Examples of other acids and bases that may be utilized are as follows: dichloroacetic acid, cyano propionic acid, p-chlorobenzoic acid, cyclohexyl amine, n-butyl amine, hexyl amine, diisopropyl amine.

It has been found that it is desirable that any acid or base can be utilized having a hydrogen on a hydroxy disassociation constant as disclosed hereinabove. The three reactants for the above foregoing process aid in the instant case may then be taken and mixed in the above concentrations and reacted at elevated temperatures, temperatures in the range of 140° to 170° C. to produce the desired process aid. Although such process aid can be produced in separate facilities by mixing the three ingredients and carrying out the reaction it is less expensive and more desirable in accordance with the instant case to produce the process aid in situ in the heat curable silicone rubber composition.

Accordingly, the best procedure is to take the basic diorganopolysiloxane gum of 1 million to 200,000,000 centipoise at 25° C. where the organo groups are selected from monovalent hydrocarbon radicals and halogenated monovalent hydrocarbon radicals as given above for the R and R' radicals and there be mixed into it the ingredients defined above for the process aid. Then there could be added to the mixture the required amount of filler which is from 10 to 200 parts by weight of a filler which would be mixed into the composition and then the entire composition can be heated at elevated temperatures of 140° to 170° C. for at least ½ hour to generally anywhere up to 5 hours or more and preferably for a period of time of anywhere from 0.5 to 2 hours to produce the desired process aid reaction product. It should be noted that a temperature of less than 140° can be utilized, however the reaction proceeds very slowly and more time will be required for the reaction to reach completion. If the temperature above 170° C. is utilized, this is undesired since the high temperature may result in the acid on base catalyst attacking the diorganopolysiloxane polymer. In addition, the time period of ½ to 5 hours is not critical, the actual reaction period depending on the temperature being utilized during the reaction for forming the process aid of the instant case.

Accordingly, depending upon the temperature, a reaction time of at least 0.5 hours may be utilized and more preferably a reaction time of 0.5 to 5 hours.

The composition may then be taken and devolatilized to remove unreacted cyclictrisiloxane and remove the acid or base catalyst if they are volatile. If such acid or base catalyst is not volatile then a neutralizing agent has to be added to the composition to neutralize the acid or base otherwise over a period of time, the presence of such acid or base may degrade the polymer.

Accordingly, examples of neutralizing agents that may be utilized are for instance acetic acid, phosphoric acid, ammonium hydroxide, etc. These are the most preferred neutralizing agents. Other neutralizing agents are for instance lithium hydroxide, sodium bicarbonate, magnesium oxide, isopropyl amine, and triethyl amine.

Accordingly, after the composition has been neutralized, if such is necessary, then the other ingredients may be mixed into the composition that are necessary in the composition and finally the peroxide catalyst so after the composition has been formed to a part the composition may be heated at elevated temperatures to produce a cured silicone elastomer.

It should be noted that in the process aid reaction product, that is the total content of the reactants for producing the process aid reaction product of the instant case, is to be added at a concentration of anywhere of 1 to 25 parts by weight per 100 parts of the diorganopolysiloxane gum. If the reaction product process aid of the instant case has been formed prior to addition to the diorganopolysiloxane polymer then it can be utilized as such in the above concentrations. However, where the reactants for producing The process aid are mixed into the base diorganopolysiloxane polymer to form the process aid insitu the total weight of the ingredients has to be within the above ranges based on 100 parts of diorganopolysiloxane polymer. It should also be noted that the formula for the process aid that is formed, has not been put down in the instant case and a reaction product is claimed because it is not known what the exact structure of the process aid that is formed. The diorganopolysiloxane polymer of the heat curable silicone rubber composition is well known. Such polymers are produced by hydrolyzing diorganodichlorosilanes and then cracking such diorganodichlorosilane hydrolyzate with potassium hydroxide to distill overhead cyclopolysiloxanes from which the cyclotetrasiloxane can be distilled in pure form. The cyclictetrasiloxanes are then taken in pure form and equilibrated at elevated temperatures, that is temperatures above 140° C., in the presence of small amounts of alkali metal hydroxide and also in the presence of chainstoppers such as hexamethyldisiloxane in appropriate amounts to form in an equilibration reaction a diorganopolysiloxane polymer of a viscosity of anywhere from 1 million to 200 million centipoise at 25° C. The maximum point of conversion point is usually reached when 85% of the cyclictetrasiloxanes have been converted to the linear polymer. In the case of fluorosilicone polymers in cyclictrisiloxanes are substantially converted to 100% to the desired fluorosilicone linear polymer. Fluoroalkyl cyclictetrasiloxanes are also converted in lesser amounts to linear diorganopolysiloxane polymer. The amount of chainstopper that is used usually determines the final molecular weight and viscosity of the linear diorganopolysiloxane polymer that is formed. After the equilibration reaction has reached its optimum point then the alkali metal hydroxide catalyst is neutralized and the volatiles vented off to give the desired linear diorganopolysiloxane polymer. Examples of the production of heat curable silicone rubber compositions is for instance to be found in Glaister U.S. Pat. No. 3,933,726 which is hereby incorporated by reference. Examples of the preparation of the fluorosilicone polymers for utilization in heat vulcanizable silicone rubber compositions are for instance to be found in the patents of John Razzano U.S. Pat. Nos. 3,997,496 and 3,937,684 hereby incorporated by reference. To this diorganopolysiloxane base polymer there is added anywhere from 10 to 200 parts by weight of filler and more preferably 10 to 150 parts by weight of filler. The filler may be reinforcing filler selected from fumed silica and precipitated silica or an extending filler such a lithipore, etc. or a mixture of such fillers. The reinforcing fillers are desired since such fillers enhance the physical properties of the composition. It is often desired that such silica fillers such as fumed silica or precipitated silica be treated with cyclicsiloxanes or with silazanes so as to reduce the structure inducing properties of the filler to the composition without reducing the physical properties of the final silicone elastomer that is formed. Other fillers that can be utilized in the instant composition are titantium dioxide, iron oxide, aluminum oxide, as well as inorganic filler material known as inert fillers which include amond others diatomaceous earth, calcium carbonate and quartz can be employed by themselves or in combination with highly reinforcing silica fillers which improve the tensile strength or the hardness of the elastomeric products. Other examples of the extending fillers are diatomaceous silica, aluminum silicate, zinc oxides, zirconium silicate, barium sulphate zinc sulfide, aluminum silicate and fibrous material such as glass fibers, cotton fibers and carbon black, etc. The use of a specific filler will be tailored to the particular use of the composition and there is much freedom in the selection of such fillers as is well known in the silicone art.

It is preferred that the process aid reactants of the instant case be added to the diorganopolysiloxane base polymer and mixed into it just prior to the addition of the filler and then the composition is heated at elevated temperatures to produce the desired process aid of the instant case. In an alternative procedure, the process aid ingredient of the instant case may be added after the incorporation of the filler into the diorganopolysiloxane polymer or at the same time as the incorporation of a filler into the diorganopolysiloxane polymer. It is preferred that the process aid ingredient in the instant case be added before or at the same time the filler is added to the base diorganopolysiloxane polymer since this facilitates the mixing of the filler into the polymer. Other well-known additives can be added to the composition. Such as for instance self-bonding additives such as silylisocyanurates, flame retardant additives such as a platinum compound alone or in combination with carbon black; aging additives such as cerium oxide and compression set additives.

Finally, there may be added to the composition of a small amount of peroxide catalyst and the composition is heated at elevated temperatures, that is temperatures above 150° C. to activate the peroxide catalyst so as to form a silicone elastomer. Generally, there may be utilized anywhere from 0.1 to 10 parts by weight of a peroxide catalyst per 100 parts by weight of a diorganopolysiloxane polymer.

The curing of the silicone rubber composition of the present invention can be affected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

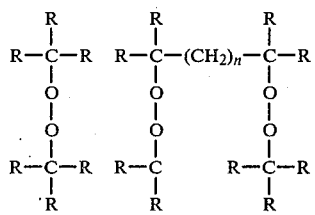

wherein R represents the same alkyl group throughout, or alkyl groups of two or more different types and n is zero or a larger integer.

Among the specific peroxide curing catalysts that are preferred are di-tertiary-butyl peroxide, tertiarybutyl-triethylmethyl peroxide, tertiary-butyl-tertiary-butyl-tertiary-triphenyl peroxide and di-tertiary alkyl peroxide such as dicumyl peroxide. Other suitable peroxide catalysts which affect curing through saturated as well as unsaturated hydrocarbon groups on the silicon chain are aryl peroxides which include benzoyl peroxide, mixed alkyl-aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc.

The process aid of the instant case may also be utilized in slightly different heat vulcanizable silicone rubber composition which is within the scope of the instant invention. Thus the process aid of the instant case may be utilized with a Si-H olefin platinum catalyzed composition, only when said is used to form the aforesaid in situ since a base will interfere with the reaction. Such a composition comprises a vinyl terminated diorganopolysiloxane polymer having a viscosity of anywhere from 1 million to 300 million centipoise at 25° C. where the organo groups are any monovalent hydrocarbon radical or halogenated monovalent hydrocarbon radical such as disclosed for the R and R' radicals above. Such polymer is produced in much the same way as the previous diorganopolysiloxane polymer except there is utilized vinyl diorganosiloxy containing chainstoppers. To this composition there is added anywhere from 10 to 200 parts per million of a filler which may be any of the filler disclosed previously and are more preferably silica fillers selected from the class of fumed silica, precipitated silica and quartz, which fillers may be treated with cyclicsiloxanes or silazanes or treated with a combination of the cyclicsiloxanes or silazanes. This composition forms one component, to which is added an effective amount of a catalyst which is a platinum containing compound. Such platinum catalyst for instance can be chloroplatinic acid where the amount of platinum is anywhere from 1 to 200 parts per million by weight of the total composition. The second part of the composition comprises either a hydrogen siloxane resin, that is a resin composed of $HR_2^5$ $SiO_{\frac{1}{2}}$ units and $SiO_2$ units or a hydrogen containing linear polysiloxane having hydrogen atoms in the polymer chain and optionally hydrogen atoms on the terminal siloxy moieties having a viscosity varying from 50 centipoise to 1000 centipoise at 25° C., or in the terminal positions of the polysiloxane chain. Other well known additives can be added to the composition when the vinyl-containing polymer and the hydride compound are stored separately. When it is desired to cure the composition, the hydride cross-linking agent is mixed with vinyl polysiloxane mixture and the platinum catalyst causes the addition of the hydrides onto the vinyl groups in the vinyl containing polysiloxanes to form a silicone elastomeric over a period of 1 hour to 24 hours at room temperature or at an extremely fast rate of 10 seconds to a minute at elevated temperatures above 100° C. Recently, it has been found that stable room temperature compositions can be obtained by mixing the two ingredients together in the pressure of an inhibitive amount of a hydroperoxy compound utilizing as an inhibitor which maintains the composition stable at room temperature for shelf storage periods for 1 year or more, but when the composition is heated at above 100° C. the ingredients react immediately to form a silicone elastomer. This is possible by the utilization of a new inhibitor which inhibitor is a hydroperoxy compound that is any compound containing a hydroperoxy group in it.

Accordingly, such mixed compositions have a good utility as heat curable silicone rubber compositions especially when the viscosity of the base vinyl-containing diorganopolysiloxane polymer has a viscosity of 1 million to 300 million centipoise at 25° C.

Accordingly, the process aid of the instant case finds utility in such a composition. Accordingly, the process aid ingredients of the instant case, may be mixed with a vinyl-containing base polymer prior to or at the same time and preferably prior to or at the same time as the mixing of the filler into the vinyl-containing base polymer and the resulting composition heated at elevated temperatures of 140° to 170° C. to produce the process aid of the instant case in situ. The same applies to this composition as was stated with the previous heat curable compositions, in that the process aid of the instant case may be formed in separate facilities and the reaction product added to the vinyl-containing polysiloxane base polymer. Example of such high viscosity SiH olefin platinum catalyzed composition which are inhibited by hydroperoxy compounds are for instance to be found in the patent application of William J. Bobear Ser. No. 675,377, filed Apr. 9, 1976. It should be noted that the use of the process aid of the instant case is not limited only to the Bobear SiH olefin viscosity platinum catalyzed composition. It can be utilized in any high viscosity silicone compositions for forming silicone elastomers. It should also be noted that in the vinyl siloxane hydride siloxane platinum catalyzed composition that the inhibitor may not be limited to the hydroperoxy inhibitor for the process aid of the instant case to operate therein. The process aid of the instant case is suitable for any high viscosity composition that is one having a viscosity in the vicinity of 1 million centipoise or above and in which there has to be incorporated into the composition a filler and more preferably a silica filler such as fumed silica or precipitated silica. In such compositions, it is preferred that the process aid of the instant case be formed in situ in the presence of the base polymer prior to or at the same time as the addition of the filler. The examples below are given for the purpose of illustrating the present invention. They are not given for any purpose of setting the limit and defining the scope of the instant invention. All parts in the instant application, including the examples are by weight.

EXAMPLE I

As disclosed in Table I below, there were prepared six compositions wherein the parts that are given in the Table are parts by weight. There was used in all cases a base polymer, which was a dimethyl polysiloxane polymer with trimethylsiloxy endstopped units, having a viscosity of 60,000,000 centipoise at 25° C. This polymer shall hereinafter be referred to as Gum A. In each composition there was added 40 parts of fumed silica in which in some cases was untreated and in which in other cases were treated with ammonia or octamethylcyclictetrasiloxane. To this mixture there was added the defined parts of the process aid ingredients of the instant case, that is the hexamethylcyclictrisiloxane ammonia hydroxide and water. The compositions were then mixed and as indicated in the Table I below, Compositions 4,5, and 6 broke up in the mixer. The other compositions which did not break-up in the mixer show that the compositions had a good process aid. It should be noted that all the Compositions were heated for two hours at 160° C. during mixing. The Compositions 1,2, and 3 which did not break up were then cured with one part for 100 parts of the dimethylpolysiloxane polymer of Cadox TS 50 (50% dispersion of 2,4-dichlorobenzoyl peroxide in silicone oil) and subsequently baked for four hours at 400° F. The physical properties of the cured Compositions 1,2, and 3 are listed in Table I below.

TABLE I

| Compositions | (all parts by weight) | | | | | |
| --- | --- | --- | --- | --- | --- | --- |
| | 1 | 2 | 3 | 4 | 5 | 6 |
| Gum A | 100 | 100 | 100 | 100 | 100 | 100 |
| Hexamethylcyclictrisiloxane (90%) | 10 | 10 | 10 | 10 | 10 | |
| NH$_4$OH | 1.2 | | | | | |
| H$_2$O | | 1.4 | 1 | 1.0 | | |
| Trifluoroacetic Acid | | | 0.2 | | | |
| Fumed Silica | 40 | | | 40 | 40 | |
| Ammonia Treated Fumed Silica | | 40 | | | 40 | |
| Octamethylcyclictetrasiloxane treated Fumed silica | | | | | | 40 |
| The unstructed compounds were heated for 2 hrs at 160° C., devolatilized, and then cured with 1 part of 2,4-dichlorobenzoyl peroxide and post-baked 4 hrs. at 400° C. | | | | | | |
| Hardness pi | 41 | 40 | 51 | Broke up in Mixer | Broke up in Mixer | Broke up in mixer |
| Tensile psi | 1050 | 1107 | 1384 | | | |
| Elongation % | 530 | 500 | 490 | | | |

Compositions 1,2 and 3 demonstrate that a good silicone rubber can be made using trimer in conjunction with water and acid or a base. The ammonia can be added in several ways as Compositions 1 and 2 show. Leaving water or ammonia out of the system resulted in a badly structured or badly broken up compound; as for instance in Compositions 4 and 5. Composition 6 shows that the procedure is more effective as a process aid in treated filler.

EXAMPLE II

As disclosed in Table II below, there were prepared four compositions, wherein the parts that are given in the Table are parts by weight. These were used in all cases, three polymers whose compositions are as follows:

Polymer B—A dimethylvinylsiloxy endstopped polydimethylsiloxane having a viscosity of 50,000,000 centipoise;

Polymer C—A trimethylsiloxy endstopped polydimethylsiloxane of 20,000,000 centipoise viscosity;

Polymer D—A 2,000,000 centipoise copolymer of dimethylsiloxy and methylvinylsiloxy, at 13 mole percent methylvinylsiloxy content and chain-stopped with trimethylsiloxy groups.

To some specific blends of polymer there was added the defined parts of process aid ingredients of the instant case, that is the hexamethylcyclotrisiloxane with combinations of trifluoroacetic acid, ethylenediamine, water and methanol as shown in Table II. To the specific mixtures there were added 40 parts of untreated fumed silica. All compositions were cooked for 2 hours under constant mixing. In Table II, Composition 1 broke up during the cook cycle. The other compositions did not break up, which showed that these compositions had good process aid in them. Compositions 2,3 and 4 were cured with one part of a 50% dispersion of 2,4-dichlorobenzoyl peroxide in silicone oil per 100 parts of composition, that is the polymer, filler and formed in situ process aid. The cured rubber was postbaked for 4 hours at 400° F. The properties of the cured compositions are listed in Table II.

TABLE II

| Compositions | all parts by weight) | | | |
| --- | --- | --- | --- | --- |
| | 1 | 2 | 3 | 4 |
| Polymer B | 47 | 47 | 47 | 47 |
| Polymer C | 48.5 | 48.5 | 48.5 | 48.5 |
| Polymer D | 4.5 | 4.5 | 4.5 | 4.5 |
| Hexamethylcyclotrisiloxane | 10 | 10 | 10 | 10 |
| Fumed Silica | 40 | 40 | 40 | 40 |
| Trifluoroacetic Acid | | .16 | | .16 |
| Ethylene Diamine | | | .085 | |
| Water | | 1 | 1 | |
| Methanol | | | | 1.4 |
| The compositions were heated for 2 hours at 160° C. with constant mixing. The compositions were cured with one part of a 50% dispersion of 2,4-di- | | | | |

TABLE II-continued (all parts by weight)

| Compositions | 1 | 2 | 3 | 4 |
|---|---|---|---|---|
| chlorobenzoyl peroxide in silicone oil, and postbaked 4 hours at 400° F. | | | | |
| Hardness, Shor A | Broke up in Mixer | 58 | 32 | 61 |
| Tensile, psi | | 1237 | 918 | 1314 |
| Elongation % | | 640 | 540 | 480 |

Compositions 2, 3 and 4 show that a good rubber can be made using a cyclic silicone trimer and either acid or base using methanol or water.

We claim:

1. A process aid which is prepared in situ in the presence of a polysiloxane gum comprising a reaction product of (a) 100 parts by weight of a cyclictrisiloxane of the formula, $(RR'SiO)_3$ where R and R' are selected from monovalent hydrocarbon radicals and halogenated monovalent hydrocarbon radicals; (b) at least 3 parts by weight of a hydroxy containing additive selected from the class consisting of $H_2O$ and $R^2OH$ where $R^2$ is an alkyl radical of 1 to 3 carbon atoms and (c) at least 200 parts per million of a catalyst selected from the class consisting of Li OH, $NH_3$, $NH_4OH$ and $R^3NH_2$ where $R^3$ is a monovalent hydrocarbon radical.

2. The process aid of claim 1 wherein R is selected from the class consisting of alkyl radicals and aryl radicals of 1 to 8 carbon atoms and R' is selected from the class consisting of alkyl radicals, alkenyl radicals, aryl radicals and fluoroalkyl radicals of 1 to 8 atoms.

3. The process aid of claim 1 wherein there is present from 3 to 15 parts by weight of $H_2O$.

4. The process aid of claim 1 wherein there is present from 4.5 to 90 parts by weight of $R^2OH$.

5. The process aid of claim 1 where there is present from 500 to 20,000 parts per million of said catalyst.

6. The process aid of claim 5 wherein there is present from 4,000 to 10,000 parts per million of $NH_3$.

7. A process for obtaining a process aid in the presence of a polysiloxane gum comprising placing a mixture of (a) 100 parts by weight of a cyclictrisiloxane of the formula, $$(RR'SiO)_3$$

where R and R' are selected from monovalent hydrocarbon radicals and halogenated monovalent hydrocarbon radicals; (b) at least 3 parts by weight of a hydroxy-containing additive selected from the class consisting of $H_2O$ and $R^2OH$ where $R^2$ is an alkyl radical of 1 to 3 carbon atoms; and (c) at least 200 parts per million of a catalyst selected from the class consisting of Li OH, $NH_3$, $NH_4OH$ and $R^3NH_2$ where $R^3$ is selected from monovalent hydrocarbon radicals in the presence of said polysiloxane gum and reacting said mixture.

8. The process of claim 7 which is carried out at a temperature in the range of 140°–170° C. for a period of time of at least 0.25 hours.

9. The process of claim 7 wherein R is selected from the class consisting of alkyl radicals and aryl radicals of 1 to 8 carbon atoms and R' is selected from the class consisting of alkyl radicals, alkenyl radicals, aryl radicals and fluoroalkyl radicals of 1 to 8 carbon atoms.

10. The process of claim 7 wherein there is present from 3 to 15 parts by weight of $H_2O$.

11. The process of claim 7 wherein there is present from 4.5 to 90 parts by weight of $R^2OH$.

12. The process of claim 7 wherein there is present from 500 to 20,000 parts per million of said catalyst.

13. The process of claim 12 wherein there is present from 4,000 to 10,000 parts per million of $NH_3$.

14. A heat curable silicone rubber composition having an improved process aid comprising (a) 100 parts by weight of a diorganopolysiloxane having a viscosity of 1,000,000 to 200,000,000 centipoise at 25° C. wherein the organo groups are selected from the class consisting of monovalent hydrocarbon radicals and halogenated monovalent hydrocarbon radicals; (b) from 5 to 200 parts by weight of filler; (c) from 0.1 to 10 parts of a curing catalyst; and (d) from 1 to 25 parts by weight of a process aid which is the reaction product of (i) 100 parts by weight of a cyclictrisiloxane of the formula, $$(RR'SiO)_3$$

where R and R' are selected from monovalent hydrocarbon radicals and halogenated monovalent hydrocarbon radicals; (ii) at least 3 parts by weight of a hydroxy containing additive selected from the class consisting of $H_2O$ and $R^2OH$ where $R^2$ is an alkyl radical of 1 to 3 carbon atoms and (iii) at least 200 parts per million of a catalyst selected from the class consisting of Li OH, $NH_3$, $NH_4OH$ and $R^3NH_2$ where $R^3$ is a monovalent hydrocarbon radical.

15. A process for preparing a process aid in the presence of a diorganopolysiloxane having a viscosity of 1,000,000 to 200,000,000 centipoise at 25° C. where the organo groups are selected from the class consisting of monovalent hydrocarbon radicals and halogenated monovalent hydrocarbon radicals and a filler comprising (a) adding to said diorganopolysiloxane a mixture of (i) 100 parts by weight of a cyclictrisiloxane of the formula, $$(RR'SiO)_3$$

where R and R' are selected from monovalent hydrocarbon radicals and halogenated monovalent hydrocarbon radicals; (ii) at least 3 parts by weight of a hydroxy containing additive selected from the class consisting of $H_2O$ and $R^2OH$ where $R^2$ is an alkyl radical of 1 to 3 carbon atoms and (iii) at least 200 parts per million of a catalyst selected from the class consisting of Li OH, $NH_3$, $NH_4OH$ and $R^3NH_2$ where $R^3$ is a monovalent hydrocarbon radical (b) adding a filler; and (c) reacting the above (i), (ii) and (iii).

* * * * *